(12) United States Patent
Dennin

(10) Patent No.: US 11,219,168 B1
(45) Date of Patent: Jan. 11, 2022

(54) SEEDLING STARTER BOX DEVICE AND METHOD FOR TRANSPLANTING SEEDLING PLANTS

(71) Applicant: Brian M. Dennin, Three Forks, MT (US)

(72) Inventor: Brian M. Dennin, Three Forks, MT (US)

( * ) Notice: Subject to any disclaimer, the term of this patent is extended or adjusted under 35 U.S.C. 154(b) by 0 days.

(21) Appl. No.: 17/335,947

(22) Filed: Jun. 1, 2021

(51) Int. Cl.
| | |
|---|---|
| *A01G 9/02* | (2018.01) |
| *A01G 9/029* | (2018.01) |
| *A01C 14/00* | (2006.01) |
| *A01G 9/00* | (2018.01) |

(52) U.S. Cl.
CPC ............ *A01G 9/0291* (2018.02); *A01C 14/00* (2013.01); *A01G 2009/003* (2013.01)

(58) Field of Classification Search
CPC . A01G 9/00; A01G 9/02; A01G 9/027; A01G 9/029; A01G 9/0293; A01G 9/0295; A01G 9/045; A01G 9/047; A01G 9/08; A01G 24/44; A01G 24/60
USPC .......................................... 111/114; 47/73, 84
See application file for complete search history.

(56) References Cited

U.S. PATENT DOCUMENTS

| | | | |
|---|---|---|---|
| 160,088 A | 2/1875 | Eby | |
| 1,198,338 A * | 9/1916 | Frakes ................. | A01G 23/046 111/101 |
| 1,246,335 A * | 11/1917 | Seelinger ................ | B42F 17/02 220/542 |
| 1,497,033 A * | 6/1924 | Sinclair .................... | A21B 3/13 249/168 |
| 1,665,124 A * | 4/1928 | Wright ..................... | A01G 9/02 47/73 |
| 2,058,934 A * | 10/1936 | Yohe ........................ | A01G 9/02 47/79 |
| 2,072,395 A | 3/1937 | Dodson | |
| 4,237,653 A | 12/1980 | Cortez | |
| 4,251,951 A | 2/1981 | Heinstedt | |
| 4,446,982 A * | 5/1984 | Corse ...................... | A21B 3/13 220/512 |
| 5,298,041 A | 3/1994 | Huang | |
| 5,759,225 A | 6/1998 | Tanoshima | |

(Continued)

FOREIGN PATENT DOCUMENTS

| | | |
|---|---|---|
| CN | 111903384 A * | 11/2020 |
| KR | 200327235 Y1 * | 9/2003 |

(Continued)

*Primary Examiner* — Ebony E Evans
(74) *Attorney, Agent, or Firm* — MacBride Law, PLLC; William L. MacBride, Jr.

(57) ABSTRACT

A transplanting device and method to eliminate seedling replanting stresses and reduce transplanting time, allowing several seedlings to quickly and efficiently go into the ground at one time in one fluid motion. The generally rectangular box has a sliding drip plate, supported above the box floor, creating an open region, allowing for water drainage and retention through the plurality of drain holes. The first short side and the opposing second short side are detachable and removable from the generally rectangular box. An alternative method provides an open top and open end slide tray in which a plurality of sliding drip plates are arrayed and separated into a plurality of plate spaces, having a plurality of seedling plants. A pair of slide handles is used to easily remove and identify the seedling plants.

20 Claims, 9 Drawing Sheets

(56) References Cited

U.S. PATENT DOCUMENTS

| | | | | |
|---|---|---|---|---|
| 5,996,280 | A | * 12/1999 | Michailiuk | A01G 9/047 47/86 |
| 10,492,379 | B1 | * 12/2019 | Meyer | A01G 9/027 |
| 2018/0325053 | A1 | * 11/2018 | Gallant | A01G 9/047 |

FOREIGN PATENT DOCUMENTS

| | | | | |
|---|---|---|---|---|
| KR | 102095126 | B1 | * | 3/2020 |
| KR | 20200140131 | A | * | 12/2020 |

* cited by examiner

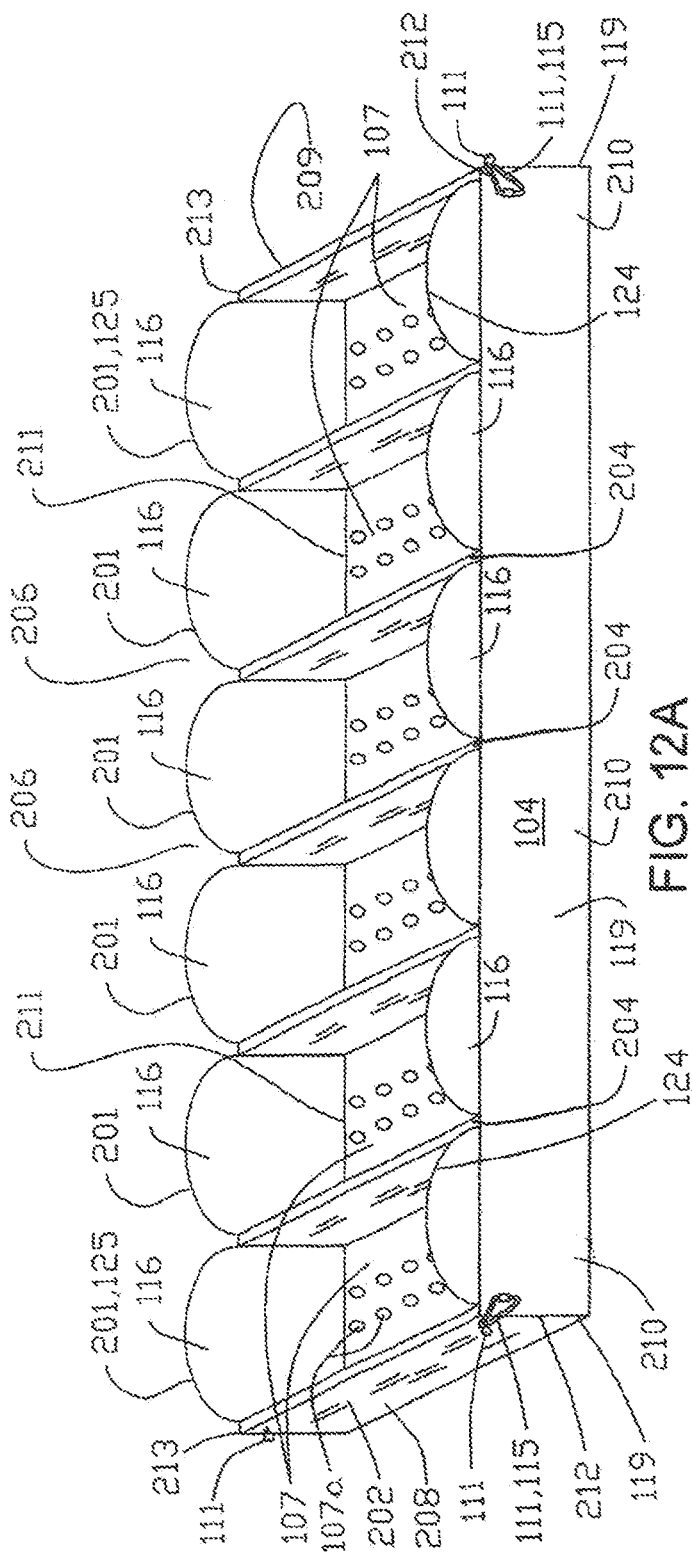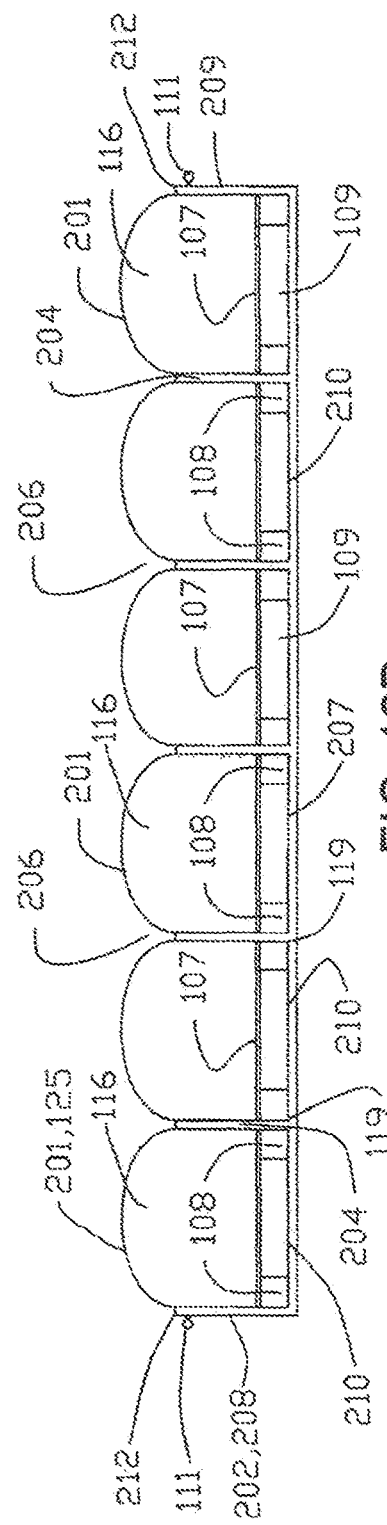

SEEDLING STARTER BOX DEVICE AND METHOD FOR TRANSPLANTING SEEDLING PLANTS

FIELD OF THE INVENTION

This application relates to plant seedling box devices and methods in the plant and landscape industries for transplanting seedlings, or seedling plants, into the ground.

BACKGROUND OF THE INVENTION

Plant seedling boxes and related devices and methods for transplanting seedlings are historically well known. However, transplanting seedlings under current practices is stressful and time consuming. Stress occurs to a seedling when it is removed from a traditional container, due to root tearing and soil medium collapsing from handling. This process, in turn, shocks and stunts the growth of the plant. In climates where growth time is limited, a setback of several days to a week can be detrimental to full development of the plant, and in the case of fruits and vegetables to the fruiting bodies, which results in lower yields. A need has clearly been perceived for a transplanting device and method to eliminate those stresses and reduce transplanting time, and for a way to allow the roots to grow freely (without limits or being root bound) on a drip tray, which will also provide valuable nutrients, eliminate root stress, and eliminate over watering. A device and method to reduce transplanting time is desired, allowing several seedlings to go into the ground at one time so that a whole row of plants can be planted quickly and efficiently in one fluid motion.

Planter boxes that are known in the industry are collapsible so that the bottom of a box containing young plants can be safely transplanted, as well as planter boxes having sliding bottoms to safely convey the entire contents of the boxes. The US Patent 160,088 to Eby ("Eby") discloses a planter box bottom that is removable from collapsible sides and secured together by mortise portions and binding pieces. The U.S. Pat. No. 2,072,395 to Dodson ("Dodson") discloses a collapsible flower box generally having sides and a bottom that interfits (fits together). Neither reference discloses a sliding drip plate disposed above the planter bottom.

Related art references were uncovered for planters having a slideable bottom to convey an entire contents of a box. U.S. Pat. No. 4,237,653 to Cortez ("Cortez") discloses a plant growing box having sides interconnected by hinges at each corner, having removable pins allowing the sides to be disassembled and a perforated floor functions as a drip plate slidingly received within the box, but at the bottom of the box. None of the references uncovered disclose all of the features of the claimed device; namely, a planting box having removable sides or ends and a sliding drip plate received within the box that is disposed over the floor of the box. Neither Eby or Dodson would be modified to receive a sliding drip plate as set forth in Cortez, to combine the fixed floor of a planter box with a sliding drip plate over the floor of the box.

There is no prior art suggestion for modifying Eby or Dodson in the manner as set forth. In particular, the proposed invention provides a sliding drip plate in combination with a fixed floor. Nothing in the prior or related art suggests that it would have been obvious to combine the fixed floor of a planter box with a sliding drip plate in the manner of the invention.

None of the references in the related art contain every feature of the present invention, and none of these references in combination disclose, suggest, or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The present invention is a transplanting device and method to eliminate seedling plant replanting stresses and reduce transplanting time, and to allow the roots to grow freely on a drip tray, and provide valuable nutrients, and eliminate over watering, as well as to allow several seedlings to go into the ground at one time so that a whole row of plants can be planted quickly and efficiently in one fluid motion. The device has a generally rectangular box with a first long side and an opposing second long side, a first short side, and an opposing second short side. The generally rectangular box has a sliding drip plate allowing a plurality of seedling plants to be replanted into a trough in a ground, being disposed over the box floor, and having a plurality of drain holes. The plurality of seedling plants are temporarily planted within box soil on the sliding drip plate, growing temporarily during transport and eventual transplanting. The plurality of drain holes act as a screen providing drainage of water. In alternative embodiments of the present invention, the sliding drip plate is biodegradable material. The generally rectangular box has a pair of shelf strips running along each of its first long side and the opposing second long side supporting the sliding drip plate above the box floor, creating an open region above the box floor, allowing for water drainage and retention through the plurality of drain holes. The first short side and the opposing second short side are detachable and removable from the generally rectangular box and secured by an attaching means snugly and cooperatively against the generally rectangular box. The attaching means is located at a first box end and an opposing second box end, and cooperatively engages and disengages, allowing easy sliding removal of the sliding drip plate from the generally rectangular box, by sliding along the pair of shelf strips above the fixed bottom. In one alternative, the attaching means comprises a plurality of stud holes running through the first long side and the opposing second long side proximal to the first box end and the opposing second box end. A plurality of securing studs is permanently located in the plurality of stud holes, and two pairs of hatch securing loops are partially secured to the first short side and the opposing second short side and have an opposing loop free end. In an alternative embodiment, the attaching means may comprise a plurality of removable pins, a plurality of joints, or other of the attaching means cooperatively and removably affixing the first short side and the opposing second short side, respectively to the first long side and an opposing second long side.

In an alternative embodiment, the sliding drip plate further comprises a pair of slide handles, attaching to the sliding drip plate, and having freely engageable handle flaps extending above the generally rectangular box, providing easy sliding removal of the sliding drip plates.

An alternative embodiment is a method for transplanting seedlings comprising a low stress seedling starter box device providing a generally rectangular box having a first long side and an opposing second long side, a first short side, an opposing second short side, an open box top, a box floor, a fixed bottom, a sliding drip plate disposed over the box floor, and a pair of slide handles. The method provides the sliding drip plate with a plurality of drain holes and a plurality of seedling plants supported on a pair of shelf strips, creating an open region and containing box soil, in which the plurality of seedling plants grow. The first short side and the opposing second short side are attaching to and detaching from the generally rectangular box by an attaching means, thereby allowing easy sliding removal of the sliding drip plate. A trough is prepared in the ground along the seedling plant row, and the sliding drip plate is pulled out from the generally rectangular box into the seedling plant row, in a singular fluid motion. The method, thereby, transplants the plurality of seedling plants in the ground without disturbance.

An alternative method provides an open top and open end slide tray in which a plurality of sliding drip plates are arrayed, and comprising a tray floor, a first short side and an opposing second short side detachable and removable from the open top and open slide tray, and a plurality of row dividers segmenting the open top and open end slide tray into a plurality of plate spaces, separating each of the plurality of sliding drip plates. One of the plurality of sliding drip plates is provided within each of the plurality of plate spaces supporting a plurality of seedling plants temporarily planted within box soil. A pair of slide handles are attached to each sliding drip plate at the first plate end and the opposing second plate end, with a freely engageable handle flap extending above the open top and open end slide tray to provide easy sliding removal of the plurality of sliding drip plates. A pair of shelf strips run along each of the first tray long side and the opposing second tray long side and support each of the plurality of sliding drip plates, creating an open region within each of the plurality of plate spaces between the plurality of sliding drip plates and the tray floor. Each of the plurality of seedling plants have seedling roots located above the plurality of sliding drip plates, within the box soil. The first short side and the opposing second short side are detachable and removable from, and are snugly securing to and against, the open top and open end slide tray by an attaching means, cooperatively enclosing each of the plurality of plate spaces. The attaching means is anchored at a first tray outside end and an opposing second tray outside end and cooperatively engage and disengage from the open top and open end side tray, allowing easy removal of the plurality of sliding drip plates. One of the attaching means is disengaged, removing one of the first short side or the opposing second short side allowing each of the plurality of sliding drip plates to be easily accessed and removed. A trough in the ground is prepared along the seedling plant row, the open top and open end slide tray is tilted toward the trough, and each of the plurality of sliding drip plates is pulled out and into the seedling plant row in the trough in a singular fluid motion. In this method the plurality of sliding drip plates with the plurality of seedling plants are transported and transplanted without disturbing the plurality of seedling plants.

There are several advantages of the present invention. One advantage is to eliminate seedling stress and delay when transplanting the plurality of seedling plants. Stress occurs due to root tearing and planting medium collapsing from handling, which, in turn, shocks and stunts the growth of the plurality of seedling plants. Delay of several days to a week in planting can be detrimental to the full development of the plant, particularly to the fruiting bodies in the case of fruits and vegetables, and frequently results in lower plant yields. The plurality of seedling plants are not separately moved, eliminating the stress of uprooting the seedling roots and replanting each of the plurality of seedling plants, as is conventionally done.

Having a biodegradable or compostable sliding drip plate is another advantage, since the seedling roots can grow freely on the sliding drip plate and find their way through the plurality of drain holes for nutrients, as well as eliminating stress to the seedling roots, because the sliding drip plate will be planted with the plurality of seedling plants. The box soil is not disturbed, and any desired seeds may be used.

Another advantage is that the plurality of sliding drip plates is in one alternative arrayed in an open top and open end slide tray allowing for a plurality of seedling plants to be transported and transplanted in one large batch (or box of plants).

Another advantage is having the open region, where the sliding drip plate rests on the pair of shelf strips, allowing for water drainage through the plurality of seedling plants, a dryer tray, and eliminating over watering.

Another advantage is that the plurality of seedling plants will not be affected by transplanting (no root damage or soil disruption) since the sliding drip plate is planted as well, allowing the gardener/planter to regain the precious time lost by traditional transplanting methods that cause root damage and plant stress.

Another advantage is that multiple seedlings are able to be planted in one container. Transplanting time is reduced, because several seedlings, the plurality of seedling plants, go into the ground at one time. Thus, a whole row of plants can be planted quickly and efficiently in one fluid motion.

Another advantage is that the pair of slide handles can be used to label and identify the plurality of seedling plants. The desired seed stock, the proper type of plurality of seedling plants can then be planted in the ground according to the directions provided by the seed stock company.

Another advantage is that by having the trough in the ground of a comparable size to the generally rectangular box, there is ample room provided to maneuver the sliding drip plate into the trough when the gardener or planter is grasping one of the pair of slide handles. Once the sliding drip plate containing the plurality of seedling plants and the box soil is removed from the generally rectangular box, the ground will simply be backfilled into any void space into the trough, and the plurality of the seedling plants will have been transplanted with minimal stress in roughly a third of the time as traditional planting methods.

The aforementioned features, objectives, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained, and other features and objects of the present invention will become apparent in the following detailed descriptions, taken in conjunction with the accompanying drawings. However, the drawings are provided for purposes of illustration only, and are not intended as a definition of the limits of the invention.

FIGS. 2 A and B illustrate the low stress seedling starter box devices of one embodiment of the present invention having a plurality of seedling plants.

FIG. 2B illustrates a front, cross sectional, elevational view depicting Cross Section A-A of the low stress seedling starter box device having one of the plurality of seedling plants.

FIG. 4 illustrates a front, elevational view of one embodiment of the present invention, depicting Cross Section B-B showing one of the elements of attaching means.

FIG. 7 A illustrates a perspective view of the internally threaded ball stud and an externally threaded element.

FIG. 7B illustrates a partial cross sectional view from Section B-B, with a perspective view of the internally threaded ball stud and externally threaded slide through peg element engaging the first long side at one of the plurality of stud holes in a partial, elevational view.

FIG. 7C illustrates a partial cross sectional view from Section B-B, with a perspective view of the internally threaded ball stud and externally threaded slide through peg elements installed within the first long side at one of the plurality of stud holes in a partial, elevational view.

FIGS. 12 A and B illustrate views of an alternative embodiment of the present invention, depicting arraying a plurality of sliding drip plates within an open top and open end slide tray, as follows:

FIG. 12A depicts a perspective view of the array of the plurality of sliding drip plates within the open top and open end slide tray having a plurality of row dividers, enclosed by a first short size and an opposing second short side (not pictured).

FIG. 12B depicts an elevational end view of one of the pair of open ends to the open top and open end slide tray (omitting the first short side) containing the plurality of sliding drip plates.

DETAILED DESCRIPTION OF THE INVENTION

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
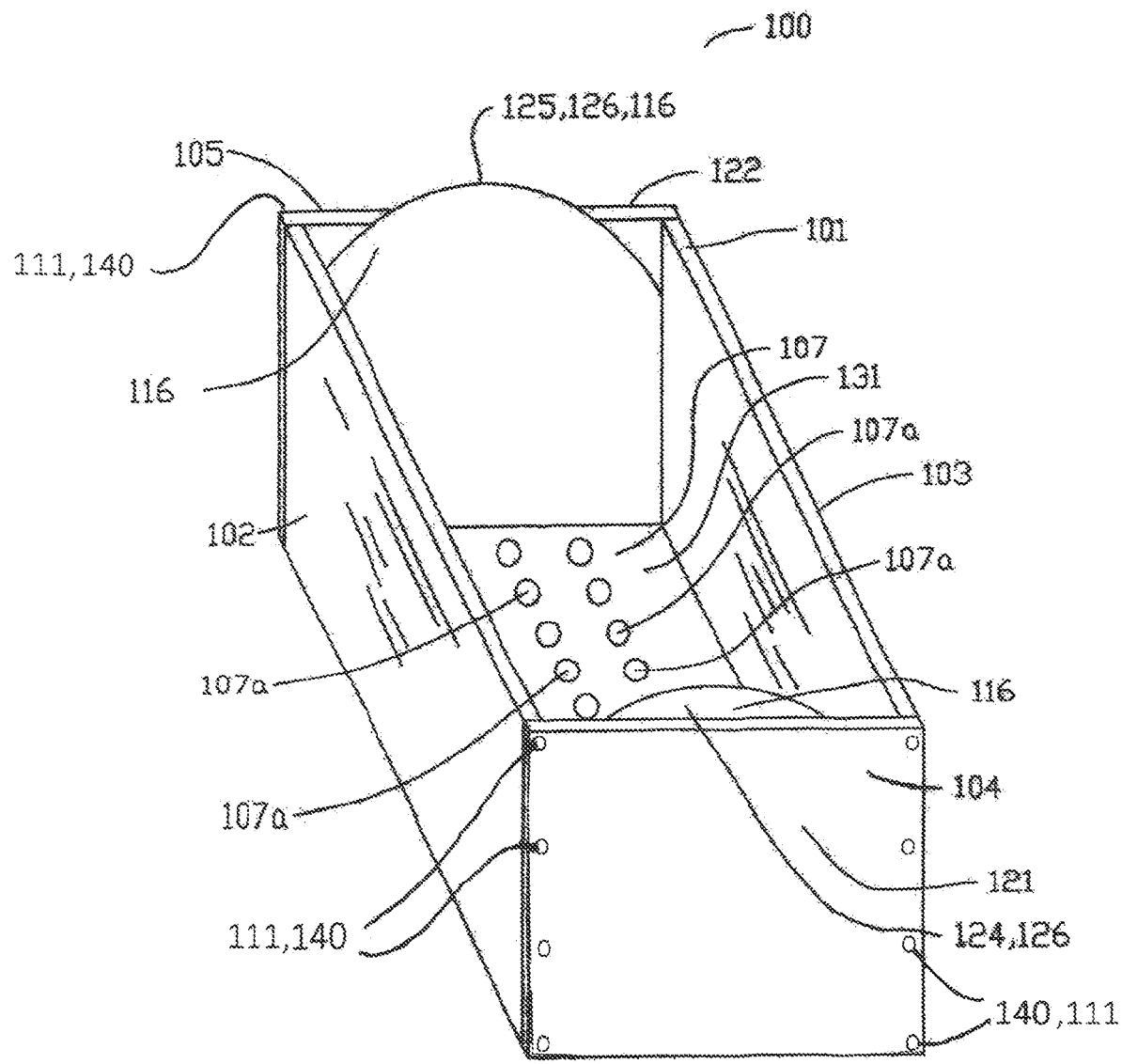
FIG. 1 illustrates a perspective view of one embodiment of the present invention, depicting the low stress seedling starter box device, with one of an attaching means.
Figure 2A:
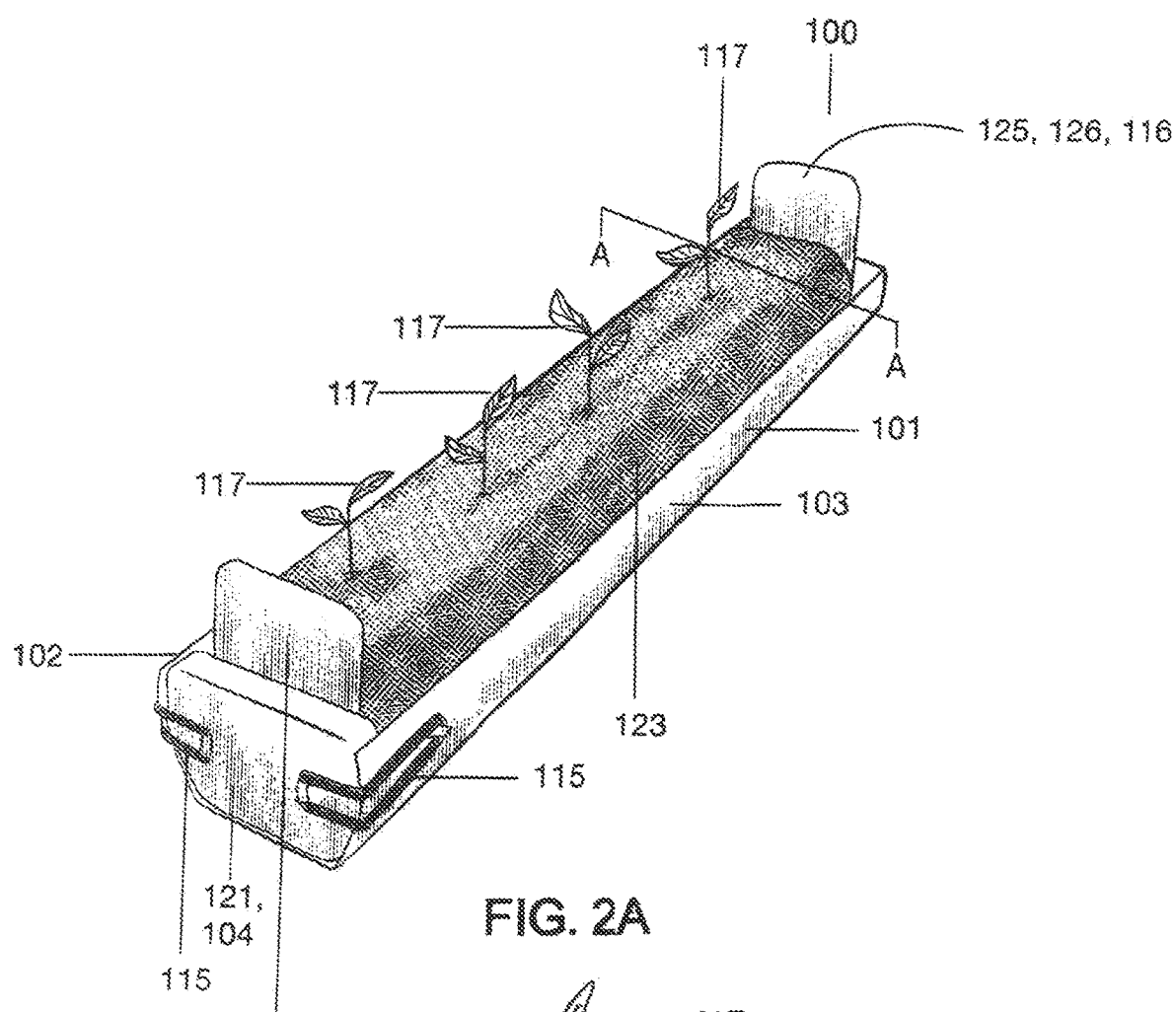
FIG. 2A illustrates a perspective view of the low stress seedling starter box device having the plurality of seedling plants. The location of Cross Section A-A.
Figure 2B:
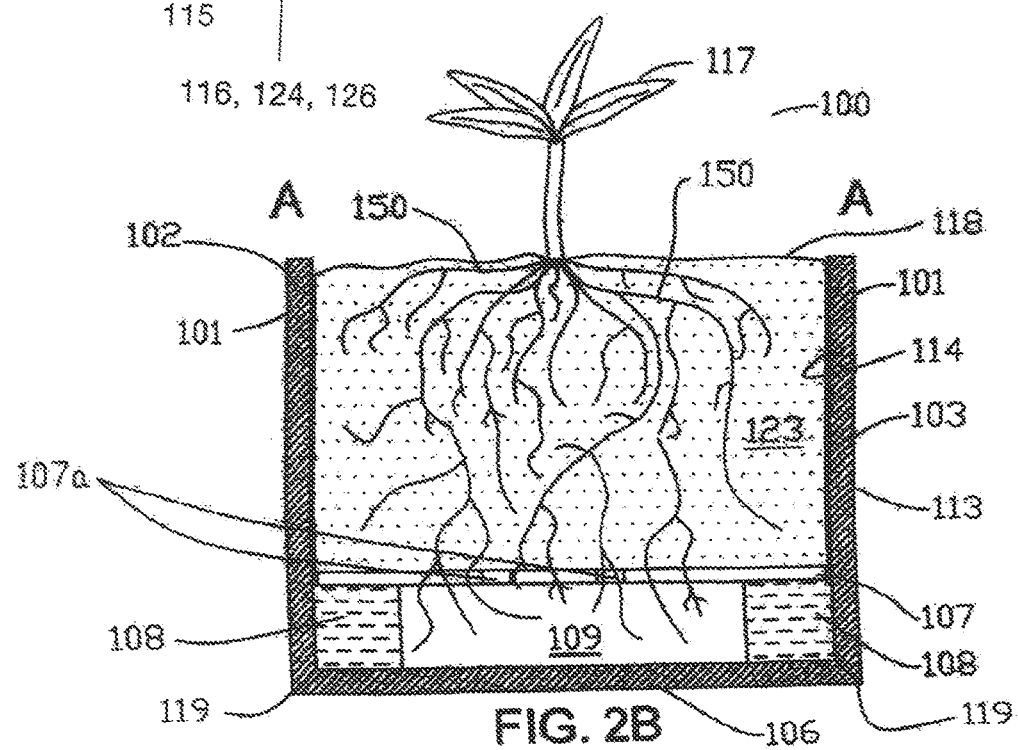
FIG. 2B, is shown.
Figure 8:
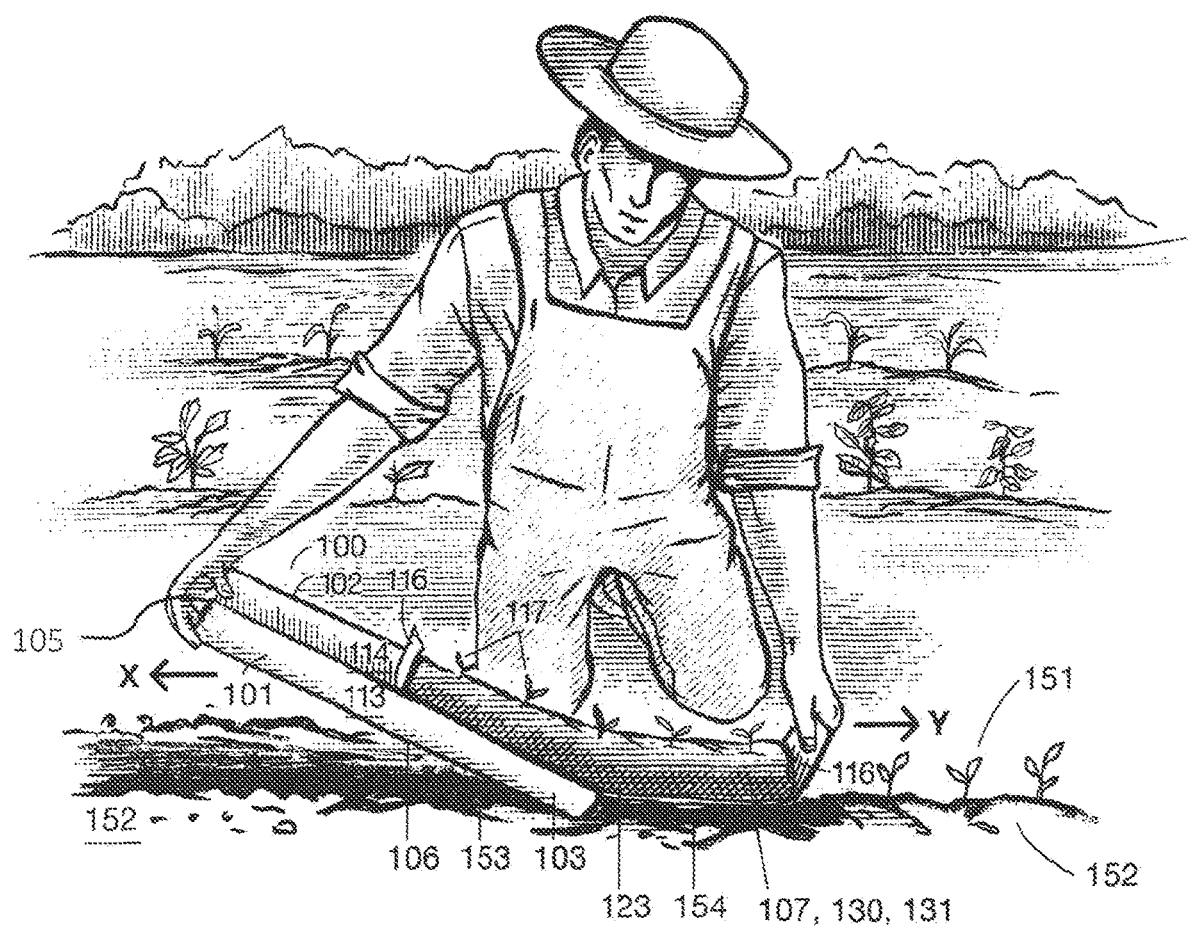
FIG. 8 illustrates a perspective view of one embodiment of the present invention, depicting the installation of the sliding drip plate, with the plurality of seedling plants from the generally rectangular box to the low stress seedling starter box device installed into a trough in the ground. References X and Y depict the direction of motion involved for the removal of the sliding drip plate (direction Y) from the generally rectangular box (direction X), enabling the plurality of seedling plants to be removed in a singular fluid motion.
Figure 9:
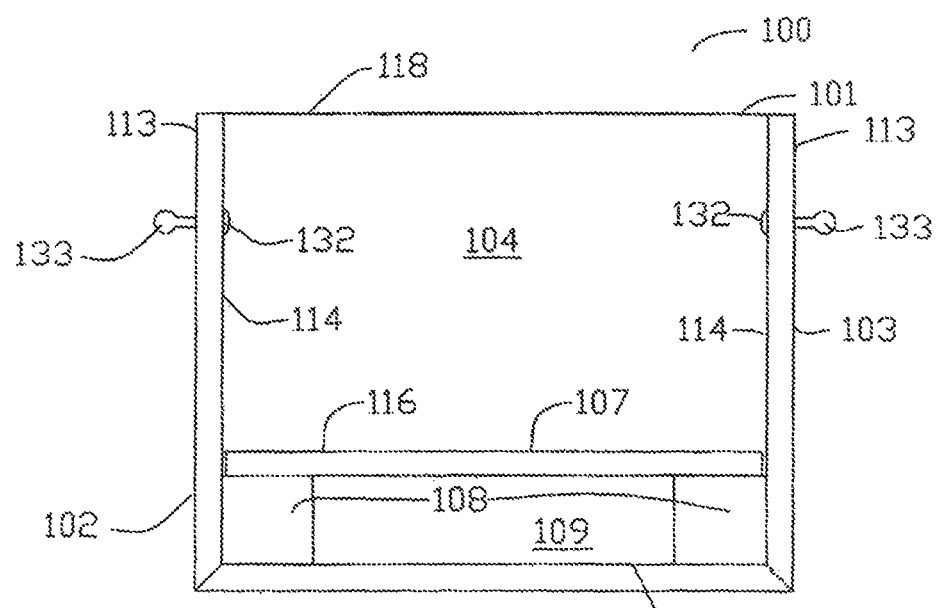
FIG. 9 illustrates a front elevational view of one embodiment of the present invention, depicting the low stress seedling starter box device, having the first short side removed, and showing the externally threaded slide through peg and the internally threaded ball stud to one of the attaching means.

Turning now in detail to the drawings in accordance with one embodiment of the present invention, depicted in FIGS. 1-11, a low stress seedling starter box device 100 has a generally rectangular box 101, which comprises a first long side 102 and an opposing second long side 103, an outside 113 and an opposing inside 114, a first short side 104 (or side hatch), and an opposing second short side 105 (or side hatch). FIG. 1 illustrates a perspective view, depicting the low stress seedling starter box device 100. FIGS. 2 A and B illustrate a perspective view and cross sectional, elevational view, respectively, showing Cross Section A-A of the low stress seedling starter box device 100 having one of a plurality of seedling plants 117 (FIG. 2A), or seedlings. The location of Cross Section A-A, in FIG. 2B, is shown in FIG. 2A. FIG. 9 illustrates a front, elevational view of the low stress seedling starter box device 100, having the first short side 104 removed, and showing an externally threaded slide through peg 132 and an internally threaded ball stud 133 to an attaching means 111, all of which are further discussed below.

The "generally rectangular box" designation is meant in this invention to include any three-dimensional forms of boxes commonly used in this industry which, as shown in FIGS. 1-12, have rectangular appearances on all sides, so that each pair of adjacent faces meets at or nearly at a right angle, including as in a cube. The generally rectangular box 101 may be termed a seedling box, tray, container, or fixed planter. While appearing generally rectangular, the generally rectangular box 101 in alternative embodiments may have slanted sides or partially slanted sides (to the first long side 102, opposing second long side 103) or slanted ends (to the first short side 104, opposing second short side 105), as commonly found in industry. The terms long and short are defined in relation to these referenced sides.

Figure 10:
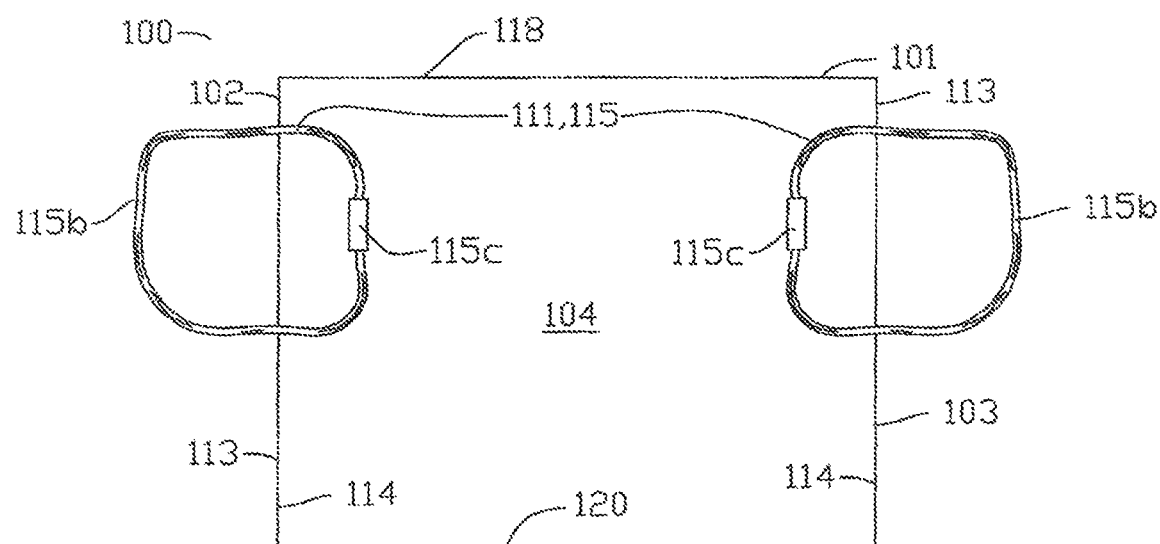
FIG. 10 illustrates a front, elevational view of one embodiment of the present invention, depicting the first short side of the low stress seedling starter box device and an alternative embodiment of one of the two pair of hatch securing loops to one of the attaching means.
Figure 11:
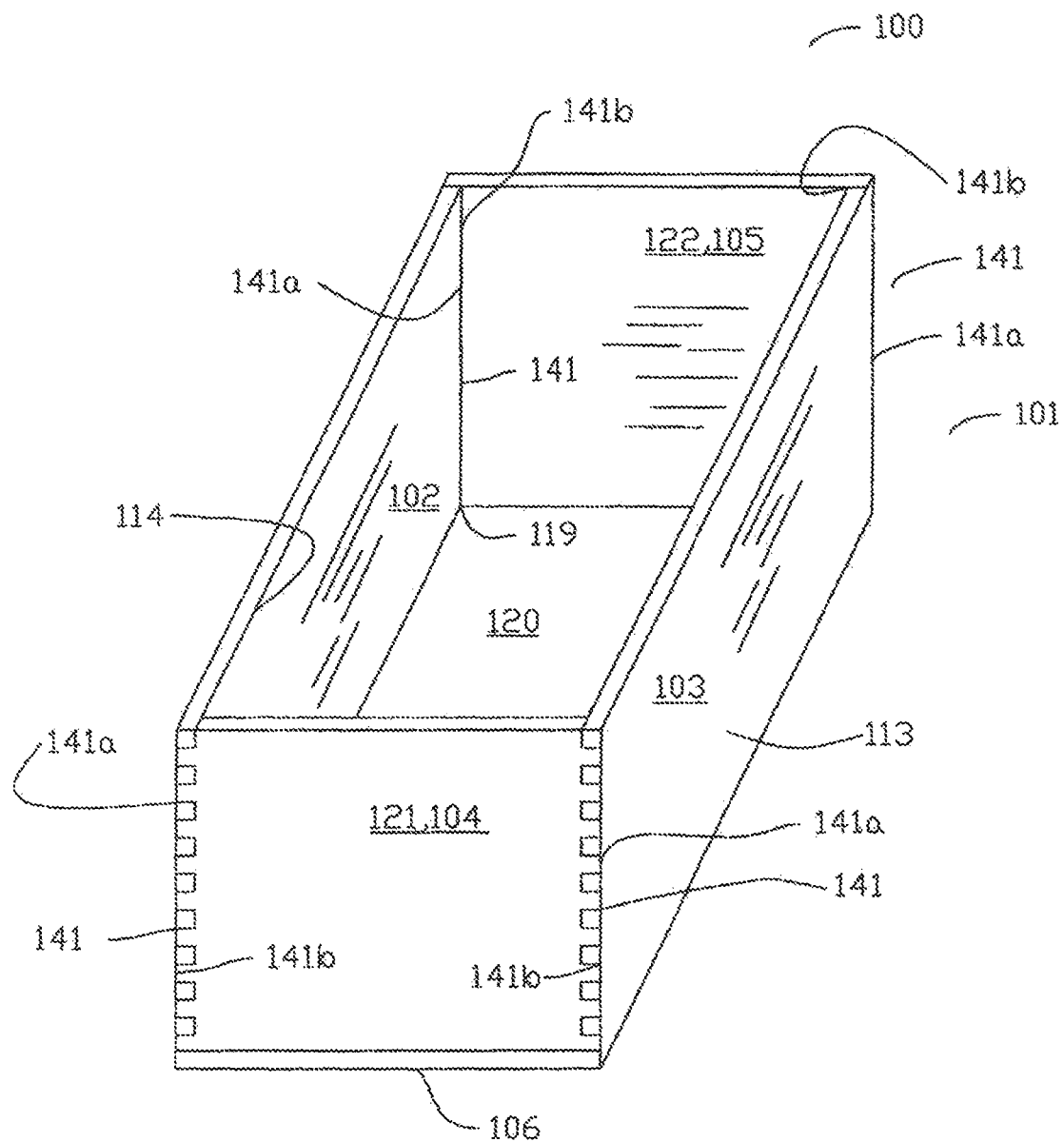
FIG. 11 illustrates a perspective view of an alternative embodiment of the present invention, depicting only the generally rectangular box, having a plurality of joints as an attaching means.

The generally rectangular box 101, also has, shown in FIGS. 8 and 10, an open box top 118 (meaning no top or lid), a box floor 120, a first box end 121 and an opposing second box end 122, and a fixed bottom 106, or floor, which is fixed or permanently attached to the generally rectangular box 101. FIG. 8 illustrates a perspective view, depicting as one embodiment of the present invention, the installation of a sliding drip plate 107, discussed in more detail below, allowing the plurality of seedling plants 117 from the generally rectangular box 101 to the low stress seedling starter box device 100 to be replanted into a trough 153 in a ground 152, or into a planting row or area. The trough 153 is understood here to mean a furrow or planting row excavated in the ground 152. References X and Y in FIG. 8 indicate the direction of motion involved for the removal of the sliding drip plate 107 from the generally rectangular box 101, enabling the plurality of seedling plants 117 to be removed in a singular effort in two mutual, concurrent, and fluid motions (FIG. 8).

Figure 3:
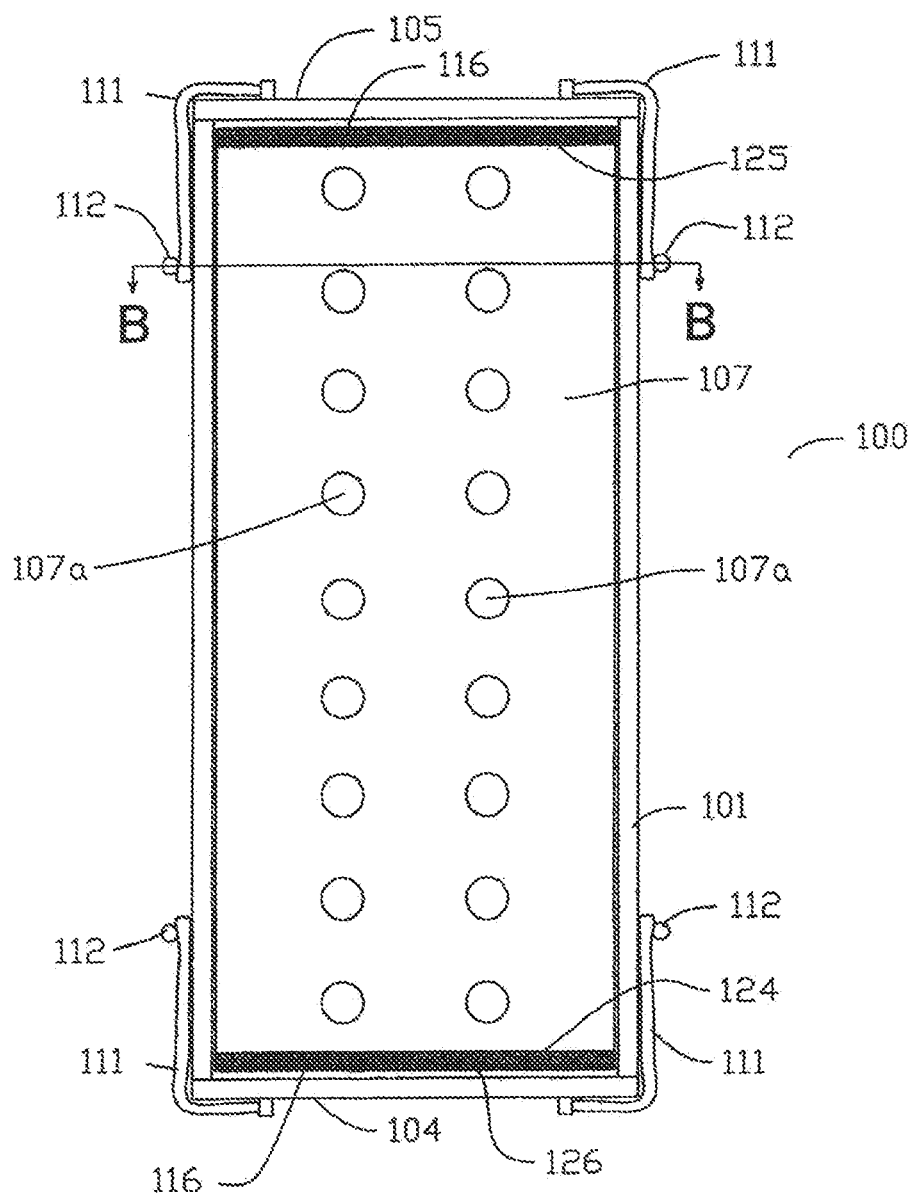
FIG. 3 illustrates a top planar view of one embodiment of the present invention, depicting the low stress seedling starter box device, without the plurality of seedling plants. The location of Cross Section B-B.

The low stress seedling starter box device 100 also has, shown in FIGS. 3 and 9, the sliding drip plate 107 disposed or located over the box floor 120, and comprises a first plate end 124 and an opposing second plate end 125. The sliding drip plate 107 also has a plurality of drain holes 107a, shown in FIGS. 1 and 3, spaced generally, equally apart (located in a generally equidistance pattern from each other) within the sliding drip plate 107, the plurality of seedling plants 117 temporarily planted above the plurality of drain holes 107 and within box soil 123 on the sliding drip plate 107, so that the plurality of seedling plants 117 may grow undisturbed temporarily during transport and eventual transplanting. The plurality of drain holes 107a act as a screen providing drainage of water within the low stress seedling starter box device 100. The sliding drip plate 107 may be termed and known in industry as a drip tray, drip plate shelf, slide plate, or elevated plate shelf. In alternative embodiments of the present invention, the sliding drip plate 107 is made of biodegradable material 131. In an alternative embodiment, the biodegradable material 131 is composted, compressed, and formed cow manure. The generally rectangular box 101 in alternative embodiments comprises at least one of: wood, cardboard, molded plastic, or other light weight, durable material 130.

Figure 4:
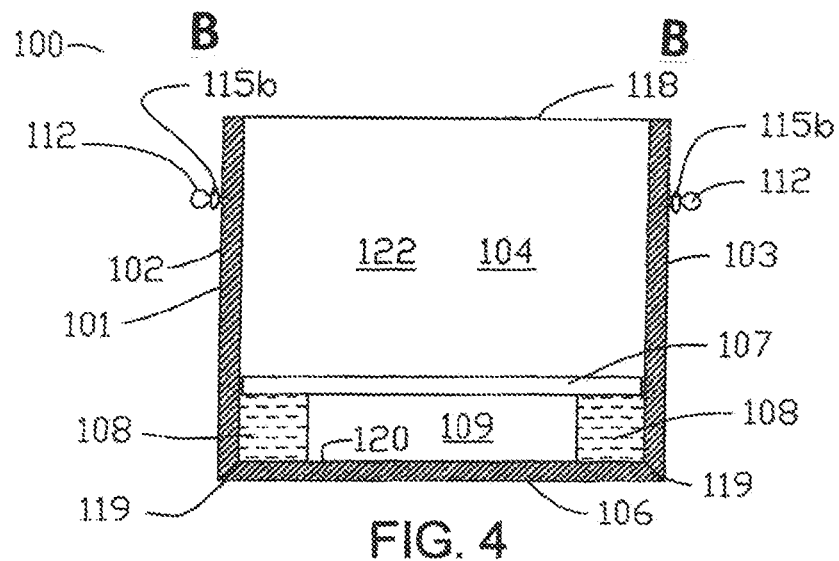
FIGS. 4, 7B and 7C, is shown.
Figure 5:
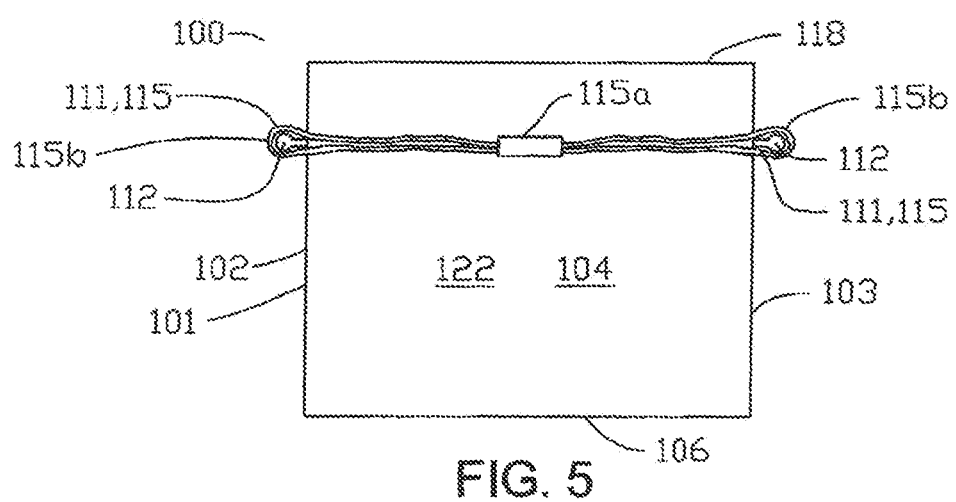
FIG. 5 illustrates a front, elevational view of one embodiment of the present invention, depicting the first short side of the low stress seedling starter box device and one of the attaching means.
Figure 6:
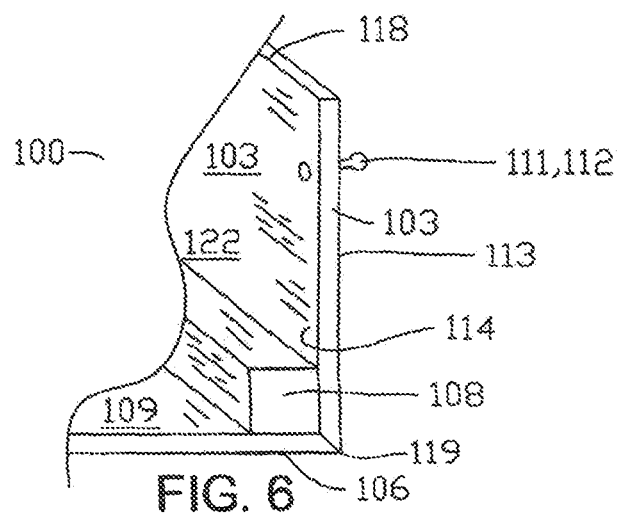
FIG. 6 illustrates a partial, perspective, and front elevational view of one embodiment of the present invention, depicting one of the pair of shelf strips in the low stress seedling starter box device having the first short side removed.
Figure 7A:
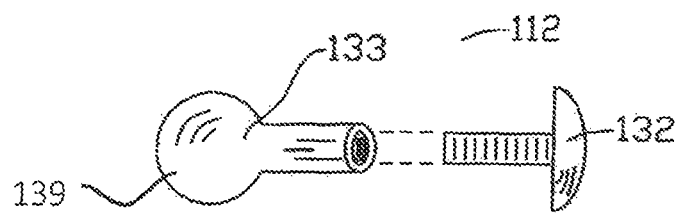
FIGS. 7 A-E illustrate views of some of the elements of the attaching means of one embodiment of the present invention, as follows.
FIG. 7D illustrates a perspective view of a threaded screw having the internally threaded screw head for a ball stud.
FIG. 7E illustrates a perspective view of a pressure fitting clip having a clip head fora ball stud head.
Figure 7B:
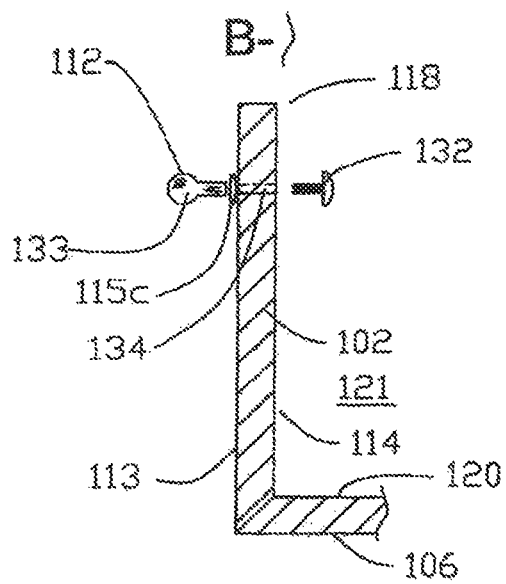
Figure 7C:
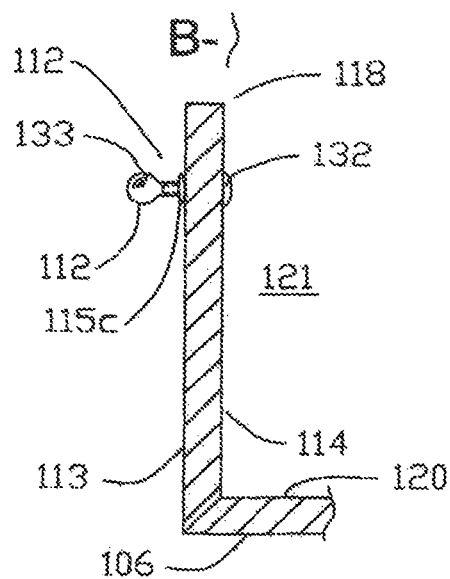
Figure 7D:
Figure 7E:
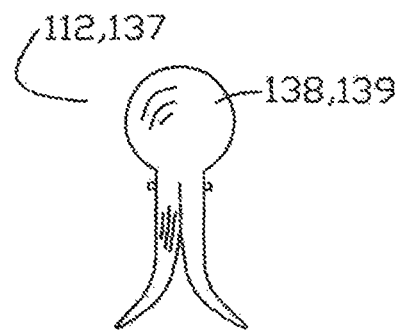

The low stress seedling starter box device 100 also has (in FIGS. 2 and 4-6) the first long side 102 and the opposing second long side 103 permanently adjoining to and attaching along the fixed bottom 106 at their respective one of a pair of junctures 119 (the juncture being the point or line where the first long side 102 and the opposing second long side 103 meet the fixed bottom 106) thereby forming the generally rectangular box 101, and has a pair of shelf strips 108 (or supporting edges or ridges) (FIGS. 2B, 4, 6, and 9) respectively running in the opposing inside 113 along each of the first long side 102 and the opposing second long 103, adjoining, abutting, and fixing to the generally rectangular box 101 at and proximal to the pair of junctures 119, either permanently or loosely (temporarily or removably). In this manner, the pair of shelf strips 108 are understood to snugly fit against the pair of junctures 119. FIG. 4 illustrates a front, cross sectional, and elevational view, depicting the low stress seedling starter box device 100, having the first short side 104 omitted; and FIG. 6 illustrates one of the pair of shelf strips 108 in the low stress seedling starter box device 100 having the first short side 104 removed. As depicted, these pair of shelf strips 108 cover only a portion of the box floor 106, adjacent to the pair of junctures 119.

The pair of shelf strips 108 (FIGS. 2B, 4, and 6) support and dispose, or locate, the sliding drip plate 107 above and proximal to the box floor 120, creating an open region 109, or space unoccupied by any permanent or fixed elements, within the generally rectangular box 101 between the sliding drip plate 107 and the box floor 120. Seedling roots 150 from each of the plurality of seedling plants 117 are located above, and maybe extending from, the sliding drip plate. The open region 109 (FIG. 2B) allows for water drainage and retention through the plurality of drain holes 107a (FIG. 3), and for root space and growing space, if needed, for the plurality of seedling plants 117, where the seedling roots 150 may grow freely (without being root bound) and on a dry tray, and may extend through the sliding drip plate 107 into the open region 109. The sliding drip plate 107 contains and supports box soil 123 allowing the plurality of seedling plants 117 to temporarily grow in the box soil 123 on the sliding drip plate 107. The box soil 123 in the invention may be any form of soil added to the open region 109 appropriate for the temporary planting and growth of the plurality of seedling plants 117.

In alternative embodiments of the present invention, the pair of shelf strips 108 may comprise one of: wood, cardboard, molded plastic, or other light weight durable material 130; and, respectively run intermittently or completely along each of the first long side 102 and the opposing second long side 103 supporting the sliding drip plate 107; and respectively run in alternative embodiments one of: temporarily, removably, or permanently along each of the first long side 102 and the opposing second long side 103, shown in FIGS. 2, 4, 6 and 9.

The first short side 104 and the opposing second short side 105 to the generally rectangular box 101 are detachable and removable from the generally rectangular box 101 by an attaching means, FIGS. 1, 3-& 7A-E. The attaching means 111 (shown in whole or part in FIGS. 5, 6, 7 A-E, and 10), such as an elastic securing mechanism in one alternative embodiment, are means to secure and fit, respectively, the first short side 104 and the opposing second short side 105 snugly and cooperatively (working in a supporting and securing manner) against the generally rectangular box 101. The attaching means 111 are located, respectively at the first box end 121 and the opposing second box end 122, and are periodically, cooperatively engaged and disengaged (in other words, becoming attached or unattached as needed, allowing for the removal thereof) from the first short side 104 and the opposing second short side 105 from the generally rectangular box 101; thereby, when either the first short side 104 or the opposing second short side 105 are detached, allowing easy sliding removal of the sliding drip plate 107 from the generally rectangular box 101, as depicted in FIG. 8, where the sliding drip plate 107 is removed or slides out of the generally rectangular box 101 by sliding along the pair of shelf strips 108 above the fixed bottom 106.

In an alternative embodiment of the present invention, shown in whole or part in FIGS. 3, 6, and 7 A-E, the attaching means 111 comprise a plurality of stud holes 134 (FIG. 7B) running through the first long side 102 and the opposing second long side 103, from the outside 113 to the opposing inside 114, proximal respectively to the first box end 121 and the opposing second box end 122. A plurality of securing studs 112, or securing posts, are permanently located in the plurality of stud holes 134 and protrude from an outside 113 of the first long side 102 and the opposing second long side 103, each of the plurality of securing studs 112 having a ball stud head 139, through the generally rectangular box 101 to an opposing inside 114 of the first long side 102 and the opposing second long side 103 proximal, respectively to the first box end 121 and the opposing second box end 122. The attaching means 111 also comprise two pairs of hatch securing loops 115. Each of the two pairs of hatch securing loops 115 are partially, cooperatively, and centrally secured at a loop secured end 115*a*, respectively to the first short side 104 and the opposing second short side 105, and have an opposing loop free end 115*b* shown particularly in FIG. 5, to be looped over and secured over one of the plurality of securing studs 112. Each of the plurality of securing studs 112, shown in FIGS. 7A-E, comprise at least one of: (a) an externally threaded slide through peg 132 (externally threaded meaning threaded on the outside of the peg), the ball stud head 139 and an internally threaded ball stud 133 (threaded on the inside), the externally threaded slide through peg 132 securely fitting within the internally threaded ball stud 133 to enable the plurality of securing studs 112 to be fixedly secured within the plurality of stud holes 134 (at the opposing inside 114) as shown in FIGS. 7A-C; (b) a threaded screw 136 (FIG. 7D) having a screw head 135 as the ball stud head 139 to enable the plurality of securing studs 112 to be fixedly secured within the plurality of stud holes 134; (c) a pressure fitting clip 137 (FIG. 7E) having a clip head 138 as the ball stud head 139 to enable the plurality of securing studs 112 to be fixedly secured within the plurality of stud holes 134; or (d) other of one of a plurality of securing studs 112 fixedly secured within the plurality of stud holes 134, from any of other securing studs know in the industry. In this manner, each of the two pairs of hatch securing loops 115 cooperatively and securely attach to, engage on, and disengage the first short side 104 and the opposing second short side 105 from the first long side 102 and the opposing second long side 103, by the plurality of securing studs 112, by attaching and releasing the opposing loop free end 115*b* from the ball stud head 139. In an alternative embodiment, the two pairs of hatch securing loops 115 comprise elastic, securely fitting material, allowing for a cooperative and secure fitting to the plurality of securing studs 112. In another alternative embodiment, shown in FIG. 10, each of the two pairs of hatch securing loops 115 may further be partially, cooperatively, and centrally secured at a separate loop secured end 115*c*, respectively to the first short side 104 and the opposing second short side 105, and each of the two pairs of hatch securing loops 115 have an opposing loop free end 115*b*. The two pairs of hatch securing loops 115 comprise one of: rope, chain, cloth bands, or other elastically fitting material.

In alternative embodiments of the present invention, the attaching means 111 may comprise at least one of: (a) a plurality of removable pins 140 (shown in FIG. 1) removably fixed through and securing the first short side 104 and an opposing second short side 105, respectively to the first long side 102 and an opposing second long side 103; (b) a plurality of joints 141 (shown in FIG. 11) located on two pair of long side ends 141*a* and two pair of short side ends 141*b* to the respective first long side 102 and the opposing second long side 103, and to the respective first short side 104 and the opposing second short side 105, thereby cooperatively and removably affixing the first short side 104 and the opposing second short side 105, respectively to the first long side 102 and the opposing second long side 103; or (c) other of the attaching means 111 cooperatively and removably affixing the first short side 104 and the opposing second short side 105, respectively to the first long side 102 and an opposing second long side 103. The plurality of joints 141 (in FIG. 11) may be any number and/or type of carpentry joints common in carpentry work to produce boxes, such as dove tail joints.

In an alternative embodiment of the present invention, the sliding drip plate 107, shown in FIGS. 1 and 8, further comprises a pair of slide handles 116, or label tabs, attaching to the sliding drip plate 107, respectively at the first plate end 124 and the opposing second plate end 125. Each of the pair of side handles 116 has a freely engageable handle flap 126 extending above the generally rectangular box 101. The pair of slide handles 116 provide easy sliding removal of the sliding drip plates 107 enabling the sliding drip plate 107 to be easily removed from the generally rectangular box 101.

An alternative embodiment of the present invention is a method for transplanting seedlings comprising a low stress seedling starter box device 100 providing a generally rectangular box 101 having a first long side 102 and an opposing second long side 103, a first short side 104 (or side hatch) and an opposing second short side 105 (or side hatch), and an outside 113 and an opposing inside 114 as in FIGS. 1, 2, 8, and 9. The generally rectangular box 101 in this method, also, has (shown in FIGS. 8 and 10) an open box top 118, a box floor 120, a first box end 121 and an opposing second box end 122, and a fixed bottom 106, or floor; and (shown in FIGS. 3 and 9) a sliding drip plate 107 disposed over the box floor 120, comprising a first plate end 124 and an opposing second plate end 125, and a pair of slide handles 116 each cooperatively locating on the respective first plate end and the opposing second plate end 124. The sliding drip plate 107 also has a plurality of drain holes 107*a* (shown in FIG. 1) spaced (located in a generally equidistance pattern from each other) within the sliding drip plate 107, and a plurality of seedling plants 117, or seedlings, temporarily planted above the plurality of drain holes 107*a* and on the sliding drip plate 107. This method permanently adjoins the first long side 102 and the opposing second long side 103 to and along the fixed bottom 106 at their respective one of a pair of junctures 119 with the fixed bottom 106, and runs or locates a pair of shelf strips 108, respectively, in the opposing inside 114 along each of the first long side 102 and the opposing second long side 103, and permanently adjoins, abuts, and fixes the pair of shelf strips 108 to the generally rectangular box 101 snugly at and proximal to the pair of junctures 119. The generally rectangular box 101 in alternative embodiments comprises at least one of: wood, cardboard, molded plastic, or other light weight durable material 130. In one alternative of the method, the sliding drip plate 107 is biodegradable material 131. In another alternative embodiment, the biodegradable material 131 is composted, compressed, and formed cow manure.

This alternative embodiment of the method of the present invention (FIGS. 1, 2, 8, and 9) supports and disposes the sliding drip plate 107 proximal to and above the box floor 120 on and supported by the pair of shelf strips 108, creating an open region 109 within the generally rectangular box 101 between the sliding drip plate 107 and the box floor 120. The method provides box soil 123 on the sliding drip plate 107 above the open region 109, allowing the plurality of seedling plants 117 to temporarily grow in the box soil 123.

This alternative method embodiment (as shown by comparing FIGS. 2A, 3, 4, 5, and 8) allows the first short side 104 and the opposing second short side 105 to attach to and to detach and be removed from the generally rectangular box 101. The method secures and fits an attaching means 111, respectively to the first short side 104 and the opposing second short side 105 snugly and cooperatively against the generally rectangular box 101, and locates the attaching means 111, respectively at the first box end 121 and the opposing second box end 122. In this manner, the method cooperatively attaches, and engages and disengages the first short side 104 and the opposing second short side 105 from the first long side 102 and the opposing second long side 103 to the generally rectangular box 101 by the attaching means 111, thereby allowing easy sliding removal of the sliding drip plate 107 from the generally rectangular box 101.

In the aforementioned alternative embodiment of the method of the present invention (FIGS. 2 and 8) the method places box soil 123 on the sliding drip plate 107 of the generally rectangular box 101, and places, rests, and evenly supports the sliding drip plate 107 on the pair of shelf strips 108. The pair of slide handles 116 are abutted, respectively against the opposing inside 114 of the first short side 104 and the opposing second short side 105. The plurality of seedling plants 117 are allowed to develop in the box soil 123 in the low stress seedling starter box device 100 until a planter elects to transplant the plurality of seedling plants 117, at the desired timing for planting in a ground 152, or earth. The "desired timing" here is determined by the planter to be the proper time and season for such planting. At planting time, the method provides for orienting the low stress seedling starter box device 100 along and within a seedling plant row 151 located in the ground 152. The attaching means 111 are disengaged from the generally rectangular box 101 at the first short side 104 or the opposing second short side 105, allowing the sliding drip plate 107 to be easily accessed and removed. By this method, a trough 153 is prepared in the ground 152 along the seedling plant row 151, the trough 153 being of comparable and cooperative size to the generally rectangular box 101. The "cooperative size" is a trough of size and dimension slightly larger than the generally rectangular box 101 being used. One of the first long side 102 or the opposing second long side 103 of the generally rectangular box 101 is tilted, and the sliding drip plate 107 is pulled out of the low stress seedling starter box device 100 from the vertically lower first short side 104 or opposing second short side 105 and into the seedling plant row 151 in the trough 153, in a singular fluid motion as shown in FIG. 8 by directional motion Y. The generally rectangular box 101 is opposingly pulled out of the trough 153 (shown in FIG. 8) by directional motion X. Any void space 154, or empty space not filled by the siding drip plate 107, to the trough 153 is backfilled around the sliding drip plate 107 with at least one of: the box soil 123 or the ground 152 (or earth). In this manner, the method installs, or plants, the sliding drip plate 107 into the ground 152 in the trough 153 in a singular fluid motion by opposingly pulling the generally rectangular box 101 out of the trough 153, as shown in FIG. 8, showing the opposing motions X and Y utilized to remove the sliding drip plate 107 from the generally rectangular box 101. The trough 153 is then backfilled around the sliding drip plate 107 with at least one of: the box soil 123 or the ground 152. The method, thereby, transplants the sliding drip plate 107 of the plurality of seedling plants 117 in the ground 152 without disturbing the plurality of seedling plants 117.

In an alternative embodiment of the method of the present invention, the pair of shelf strips 108 comprise one of: wood, cardboard, molded plastic, or light weight durable material 130; and run, respectively, continually, or intermittently along each of the first long side 102 and the opposing second long side 103.

In an alternative embodiment of the method of the present invention, shown in whole or part in FIGS. 3 and 7 A-E, the attaching means 111 comprise a plurality of stud holes 134 running through the first long side 102 and the opposing second long side 103 proximal to the first box end 121 and the opposing second box end 122. A plurality of securing studs 112, or securing posts, are permanently located in the plurality of stud holes 134 and protrude from the outside 113 to an opposing inside 114 of the first long side 102 and the opposing second long side 103 proximal, respectively to the first box end 121 and the opposing second box end 122, each of the plurality of security studs 112 having a ball stud head 139. The attaching means 111 also comprise two pairs of hatch securing loops 115, and each of two pairs of hatch securing loops 115 are partially, cooperatively, and centrally secured at a separate loop secured end 115c, respectively to the first short side 104 and the opposing second short side 105, and have an opposing loop free end 115b attachable (being able to be attached) to the ball stud head 139, shown particularly in FIG. 5. Each of the plurality of securing studs 112 (shown in FIGS. 7A-E) comprise at least one of: (a) an externally threaded slide through peg 132, the ball stud head 139, and an internally threaded ball stud 133, the externally threaded slide through peg 132 securely fitting within the internally threaded ball stud 133 on the opposing inside 114 to enable the plurality of securing studs 112 to be fixedly secured within the plurality of stud holes 134, as shown in FIGS. 7A-C; (b) a threaded screw 136 having a screw head 135 as the ball stud head 139 to enable the plurality of securing studs 112 to be fixedly secured within the plurality of stud holes 134; (c) a pressure fitting clip 137 having a clip head 138 as the ball stud head 139 to enable the plurality of securing studs 112 to be fixedly secured within the plurality of stud holes 134; or (d) other of one of a plurality of securing studs 112 fixedly secured within the plurality of stud holes 134 known in the industry. In this manner, the two pairs of hatch securing loops 115 cooperatively and securely attach to, engage on, and disengage the first short side 104 and the opposing second short side 105 from the first long side 102 and the opposing second long side 103, by the plurality of securing studs 112 by attaching and releasing the opposing loop free end 115b from the ball stud head 139. In an alternative embodiment, the two pairs of hatch securing loops 115 comprise elastic, securely fitting material, allowing for cooperative and secure fitting to the plurality of securing studs 112.

In an alternative embodiment of the method of the present invention (shown in FIG. 10) each of the two pairs of hatch securing loops 115 may further be partially, cooperatively, and centrally secured at a separate loop secured end 115c, respectively to the first short side 104 and the opposing second short side 105, and have the opposing loop free end 115b. In an alternative embodiment, the two pairs of hatch securing loops 115 comprise one of: elastic, rope, chain, cloth bands, rubber bands, or other elastically fitting material.

In an alternative embodiment of the method of the present invention, the attaching means 111 may comprise at least one of: (a) a plurality of removable pins 140 (shown in FIG. 1) removably fixed through and securing the first short side 104 and an opposing second short side 105, respectively to the first long side 102 and an opposing second long side 103; (b) a plurality of joints 141 (shown in FIG. 11) located on two pair of long side ends 141a and two pair of short side ends 141b to the respective first long side 102 and the opposing second long side 103, and to the respective first short side 104 and the opposing second short side 105, thereby cooperatively and removably affixing the first short side 104 and an opposing second short side 105, respectively to the first long side 102 and the opposing second long side 103 (shown in FIG. 11); (c) or other of the attaching means 111 cooperatively and removably affixing the first short side 104 and the opposing second short side 105, respectively to the first long side 102 and an opposing second long side 103, as known in the industry.

In an alternative embodiment of the method of the present invention, the sliding drip plate 107 (shown in FIGS. 1 and 8) further comprises having the pair of slide handles 116, or label tabs, each cooperatively locating respectively at the first plate end 124 and the opposing second plate end 125, thereby attaching to the sliding drip plate 107, respectively at the first plate end 124 and the opposing second plate end 125, and each provided with a freely engageable handle flap 126 extending above the generally rectangular box 101. The pair of slide handles 116 provide easy sliding removal of the sliding drip plate 107 enabling the sliding drip plate 107 to be easily removed from the generally rectangular box 101.

In an alternative method embodiment for transplanting seedlings, said method (as shown in FIGS. 12A and 12B) provides an open top and open end slide tray 202 in which a plurality of sliding drip plates 201 are arrayed. It is to be understood that "array" here means placing or arranging the plurality of sliding drip plates 201 closely, side by side longwise within the open top and open-end slide tray 202 and separated between a plurality of row dividers 204. The open top and open end slide tray 202 comprises a tray floor 207, a first short side 104 and an opposing second short side 105 (or detachable hatches as shown in FIGS. 2A and 3 and which, in this embodiment, each cover the entire "short sides" of the open top and open end slide tray 202) and which are detachable and removable from the open top and open slide tray 202. The plurality of row dividers 204 segment the open top and open end slide tray 202 into a plurality of plate spaces 206, separating each of the plurality of sliding drip plates 201. The plurality of sliding drip plates 201 are adjacently and independently arrayed (separated so they may be individually removed), respectively within the plurality of plate spaces 206 of the open top and open end slide tray 202 between the plurality of row dividers 204.

Each of said plurality of plate spaces 201 in this method embodiment (as shown in FIGS. 12A and 12B) comprises a first tray long side 208 and an opposing second tray long side 209, a first tray short side 210 and an opposing second tray short side 211, and a pair of shelf strips 108. Each of the plurality of sliding drip plates 201 is disposed within each of the plurality of plate spaces 206, and each of the plurality of sliding drip plates 201 comprises a first plate end 124 and an opposing second plate end 125, and having a plurality of drain holes 107a generally equally spaced, within each of the plurality of sliding drip plates 201, and a plurality of seedling plants 117 which are temporarily planted on each of the plurality of sliding drip plates 201 within box soil 123 until planted in ground 152. The plurality of sliding drip plates 201 further comprises cooperatively attaching and locating a pair of slide handles 116 to each of the plurality sliding drip plates 201, respectively at the first plate end 124 and the opposing second plate end 125, whereby each of the pair of slide handles 116 have a freely engageable handle flap 126 extending above the open top and open end slide tray 202 allowing the pair of slide handles 116 to provide easy sliding removal of each of the plurality of sliding drip plates 201. The freely engageable handle flap 126 is easily accessed or "freely engageable", meaning they are easily and conveniently grasped by a planter using this invention. The first tray long side 208 and the opposing second tray long side 209 defined by the plurality of row dividers 204 are permanently adjoining to and attaching in each of the plurality of plate spaces 206 to and along the tray floor 207 at their respective one of a pair of junctures 119. A pair of shelf strips 108, respectively run along each of the first tray long side 208 and the opposing second tray long side 209, in each of the plurality of plate spaces 206 and adjoin, abut, and fix the pair of shelf strips 108 to the tray floor 207 proximal to the pair of junctures 119 along the plurality of row dividers 204. The pair of shelf strips 108 support and dispose each of the plurality of sliding drip plates 201, placed thereon, above and proximal to the tray floor 207, creating an open region 109 within each of the plurality of plate spaces 206 between each of the plurality of sliding drip plates 201 and the tray floor 207. Box soil 123 is placed on each of the plurality of sliding drip plates 201 above the open region 109. Each of the plurality of seedling plants 117 have seedling roots 150 located above and may extend from each of the plurality of sliding drip plates 201, which provide, contain and support the box soil 123 thereon and allows the plurality of seedling plants 117 to temporarily grow in the box soil 123. Each of the plurality sliding drip plates 201 (shown in FIGS. 12A and 12B) are detachable and removable from the open top and open end slide tray 202.

The first short side 104 and the opposing second short side 105 (in FIGS. 3 and 12A) are detachable and removable from the open top and open end slide tray 202 [Opposing second short side 105 to the open top and open end side tray 202 is not pictured or labeled in FIG. 12A. See FIG. 3 for position of this element (opposing second short side 105) located opposite first short side 104]. The first short side 104 and an opposing second short side 105 are snugly securing, fitting, and cooperatively attaching and engaging and disengaging, respectively to and against the open top and open end slide tray 202 (along the first tray short side 210 and the opposing second tray short 211) by an attaching means 111, and cooperatively enclosing each of the plurality of plate spaces 206. The attaching means 111 are anchored or located respectively proximally at a first tray outside end 212 and an opposing second tray outside end 213. The attaching means 111 are cooperatively attached, engaged, and disengaged from the open top and open end side tray 202, thereby allowing easy sliding removal of the plurality of sliding drip plates 201 in the plurality of plate spaces 206 from the open top and open end slide tray 202, when either of the first short side 104 or the opposing second short side 105 are removed.

In this alternative method embodiment of the present invention (shown principally in FIGS. 12A and 12B, and see FIGS. 1, and 2) each of the plurality of sliding drip plates 201 is disposed over the tray floor 207, and further comprises the plurality of seedling plants 117 temporarily planted in the box soil above the plurality of drain holes 107a on each of the plurality of sliding drip plates 201. The plurality of seedling plants 117 are allowed to develop on each of the plurality of sliding drip plates 201 until planting in the ground 152. Each of the plurality of sliding drip plates 201 are oriented along and within a seedling plant row 151 in the ground 152. The attaching means 111 to one of the first short side 104 or the opposing second short side 105 is disengaged, removing one of the first short side 104 or the opposing second short side 105 allowing each of the plurality of sliding drip plates 201 to be easily accessed and removed from each of the plurality of plate spaces 206 in the open top and open end slide tray 202. A trough 153 in the ground 152 is prepared along the seedling plant row 151, of comparable and cooperative size to one of the plurality of sliding drip plates 201. The open top and open end slide tray 202 at the removed one of the first short side 104 or the opposing second short side 105 is tilted toward the trough 153 and each of the plurality of sliding drip plates 201 is pulled out of the open top and open end slide tray 202 and into the seedling plant row 151 in the trough 153. The sliding drip plate 107 containing the box soil 123 and the plurality of seedling plants 117 to each of the plurality of sliding drip plates 201 is installed, in turn (one at a time) into the trough 153 in a singular fluid, or smooth, motion, as shown in FIG. 8 by motion Y. The open top and open end slide tray 202 is opposingly pulled out of and away from the trough 153, as shown in FIG. 8 by directional motion X. Any void space 154 around the sliding drip plate 107 in the trough 153 is backfilled around each of the plurality of sliding drip plates 201 planted in the ground 152 with at least one of: the box soil 123 or the ground 152 (earth). In this method the plurality of sliding drip plates 201 with the plurality of seedling plants 117 to the open top and open end slide tray 202 are transported and transplanted without disturbing the plurality of seedling plants 117.

The low stress seedling starter box device 100, or slide planter (FIGS. 1-11) is in essence a long planter, or box, with detachable ends and the removable drip plates. The sliding drip 107 plate is placed into the planter and the sides (the first short side 104 and the opposing second short side 105) are secured in position. The planter (low stress seedling starter box device 100) is then filled with a choice of box soil 123 and desired seed. When it is planting time, the individual doing the planting, in order to transplant the plurality of seedling plants 117, selects the first short side 104 or the opposing second short side 105 of the generally rectangular box 101, and that side, or hatch, is removed from the generally rectangular box 101. The appropriate length and width of the trough 153, or trench, is dug in the ground 152, so that the contents of the low stress seedling starter box device 100, or slide planter (the sliding drip plate 107, the box soil 123, and the plurality of seedling plants 117) will fit into the trough 153 in the ground 152. With the generally rectangular box 101, or the open top and open end slide tray 202 (in FIGS. 12A and 12B) open, touching, and tilted toward the ground 152, the individual doing the planting can grab or pull one of the pair of slide handles 116, the tabs, and tilt the low stress seedling starter box device 100, or open top and open end slide tray 202, roughly 30 degrees or to a point beyond an angle of repose (whereupon it slides) for the contained contents, and slowly slide (being unattached and "slidable") the "contents" (the sliding drip plate 107 with the box soil 123, and the plurality of seedling plants 117) out of the low stress seedling starter box device 100 and/or open top and open end slide tray 202. Once these contents are removed and placed into the trough 153 (FIG. 8), any void space 154 to the ground 152 can be back filled allowing the plurality of seedling plants 117 to have been transplanted with minimal stress and approximately one third of the time as traditional planting methods.

One of the advantages of the present invention is to eliminate seedling stress when transplanting the plurality of seedling plants 117 (shown in FIGS. 2 and 8), along with the time required to accomplish the transplanting task. Transplanting seedlings is stressful and time consuming. Stress occurs to a seedling when it is removed from a traditional container, due to root tearing and planting medium collapsing from handling. This transplanting activity could, in turn, shock and stunt the growth of the plurality of seedling plants 117 in other devices or by other methods. In climates where the time for plant growth is limited, a setback or delay of several days to a week in planting can be detrimental to the full development of the plant, particularly to the fruiting bodies in the case of fruits and vegetables. This stress and delay, also, frequently results in lower plant yields. The plurality of seedling plants 117 by the device and methods of the present invention are not separately moved in transport (as shown in FIGS. 8 and 12) eliminating the stress of uprooting the seedling roots 150 and replanting each of the plurality of seedling plants 117, as is conventionally done. The present invention eliminates those transplanting stresses and reduces transplanting time.

By having the sliding drip plate 107 (shown in FIGS. 1 and 2) that is biodegradable or compostable, the seedling roots 150 can grow freely on the sliding drip plate 107. The seedling roots 150 may inevitably find their way (extending from the plurality of seedling plants 117) through the plurality of drain holes 107a, a form of screen. The sliding drip plate 107, therefore, can provide valuable nutrients (being biodegradable) to the plurality of seedling plants 117, shown in FIG. 2B, as well as eliminating stress to the seedling roots 150, because the sliding drip plate 107 will be planted with the plurality of seedling plants 117 when they are transported and planted. The seedling roots 150 are not uprooted, as mentioned. The box soil 123 in the low stress seedling box device 100 is not disturbed. As well, any desired seeds may be used for the plurality of seedling plants 117.

Another advantage of the present invention is that the plurality of sliding drip plates 201 are in one alternative of the present invention, arrayed in an open top and open end slide tray 202 (as shown in FIG. 12A) allowing for multiple, generally rectangular boxes 101 or a plurality of plate spaces 206 having a plurality of sliding drip plates 201 arrayed together to allow for a plurality of seedling plants 117 to be transported and transplanted in one large batch.

Another advantage of the present invention is having the open region 109, the space at the fixed bottom 106 of the low stress seedling box device 100 (shown in FIGS. 2, 4, and 6) because the sliding drip plate 107 rests on the pair of shelf strips 108, allowing for water drainage through the plurality of seedling plants 117 and eliminating over watering, and allowing for a dryer tray.

Another advantage of the method of the present invention is that the plurality of seedling plants 117 will not be affected by their transplanting, and not even "realize" that they have been transplanted, as no root damage or soil disruption has occurred, since the sliding drip plate 107 (FIGS. 1-12) is planted, as well. This will allow the gardener/planter to regain the precious time lost by traditional transplanting methods that cause root damage and plant stress.

Another advantage of the alternative method of the present invention is that with multiple seedlings, the plurality of seedling plants 117 in the invention, are able to be planted from one container, the open top and open end slide tray 202 (shown in FIG. 8) which is the entire contents therein. The sliding drip plate 107 is placed in the seedling plant row 151, in the ground 152. Transplanting time is reduced, because several seedlings, the plurality of seedling plants 117, go into the ground 152 at one time. Thus, a whole row of plants, or the plurality of seedling plants 117, can be planted quickly and efficiently in one fluid motion.

Another advantage of the method of the present invention is that the pair of slide handles 116 (FIGS. 1 and 3) can be used to label and identify the plurality of seedling plants 117, the contents of the generally rectangular box 101, of the low stress seedling starter box device 100. In that manner, the desired seed stock, the proper type of plurality of seedling plants 117, can then be recorded, memorialized, and planted in the ground 152 according to the directions provided by the seed stock company.

Another advantage of the method of the present invention is that by having the trough 153 in the ground 152 of a comparable size to the generally rectangular box 101, (the trough 153 being understood here to be slightly longer and/or wider that the generally rectangular box 101, FIG. 8, and/or the sliding drip plate 107), there is ample room provided to maneuver the sliding drip plate 107 into the trough 153, when the gardener is grasping one of the pair of slide handles 116. Once the contents of the generally rectangular box 101 (the sliding drip plate 107 containing the plurality of seedling plants 117 and the box soil 123) are removed from the generally rectangular box 101, the ground 152 will simply be backfilled into any void space 154 into the trough 153, and the plurality of the seedling plants 117 will have been transplanted with minimal stress in roughly a third of the time as traditional planting methods.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention apparatus, therefore, should not be restricted, except in the following claims and their equivalents.

Although specific advantages have been enumerated, various embodiments may include some, none, or all of the enumerated advantages.

Other technical advantages may become readily apparent to one of ordinary skill in the art after review of the figures and description.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, devices, apparatuses, and methods described herein without departing from the scope of the disclosure. For example, the components of the systems, devices, methods and apparatuses may be integrated or separated. Moreover, the operations of the systems, devices, methods and apparatuses disclosed herein may be performed by more, fewer, or other components and the devices, apparatuses, and methods described may include more, fewer, or other steps. Additionally, steps may be performed thereto in any suitable order. As used in this document, "each" and "of one" refers to each member of a set or each member of a subset of a set.

To aid the Patent Office and any readers of any patent issued on this application in interpreting the claims appended hereto, applicant wishes to note that he does not intend any of the appended claims or claim elements to invoke 35 U.S.C. 112(f) unless the words "means for" or "step for" are explicitly used in the particular claim.

I claim:

1. A low stress seedling starter box device, said device comprising:
  a. a generally rectangular box, comprising: a first long side and an opposing second long side, a first short side and an opposing second short side, a box surface outside and an opposing box surface inside, an open box top, a box floor, a first box end and an opposing second box end, and a fixed bottom;
  b. a sliding drip plate disposed over the box floor, and comprising: a first plate end and an opposing second plate end, a plurality of drain holes spaced within the sliding drip plate, and a plurality of seedling plants temporarily planted above the plurality of drain holes and on the sliding drip plate;
  c. the first long side and the opposing second long side permanently adjoining to and attaching along the fixed bottom at their respective one of a pair of junctures with the fixed bottom;
  d. a pair of shelf strips respectively running in the opposing box surface inside along each of the first long side and the opposing second long side, and adjoining, abutting, and fixing to the generally rectangular box at and proximal to the pair of junctures;
  e. an open region within the generally rectangular box between the sliding drip plate and the box floor;
  f. seedling roots from each of the plurality of seedling plants located above the sliding drip plate;
  g. box soil on the sliding drip plate and in which the plurality of seedling plants temporarily grows;
  h. the first short side and the opposing second short side being detachable and removable from the generally rectangular box;
  i. an attaching means securing and fitting, respectively the first short side and the opposing second short side snugly and cooperatively against the first long side and the opposing second long side, the attaching means located respectively to the box surface outside of the first box end and the opposing second box end; and
  j. the attaching means cooperatively being periodically engaged to and disengaged from the first short side and the opposing second short side from the generally rectangular box, thereby allowing easy sliding removal of the sliding drip plate from the generally rectangular box.

2. The low stress seedling starter box device of claim 1, wherein the sliding drip plate is biodegradable material.

3. The sliding drip plate of claim 2, wherein the biodegradable material is composted, compressed, and formed cow manure.

4. The low stress seedling starter box device of claim 1, wherein the attaching means comprising:
  a. a plurality of stud holes running from the box surface outside to the opposing box surface inside through the first long side and the opposing second long side proximal to the first box end and the opposing second box end, a plurality of securing studs permanently locating in the plurality of stud holes and protruding from the box surface outside of the first long side and the opposing second long side, each of the plurality of securing studs having a ball stud head, proximal respectively to the first box end and the opposing second box end;
  b. two pairs of hatch securing loops, each of the two pairs of hatch securing loops partially, cooperatively, and centrally secured at a loop secured end, respectively to the first short side and the opposing second short side, and having an opposing loop free end attachable to the ball stud head;
c. each of the plurality of securing studs comprising at least one of:
 i. an externally threaded slide through peg, the ball stud head, and an internally threaded ball stud, the externally threaded slide through peg securely fitting within the internally threaded ball stud to enable the plurality of securing studs to be fixedly secured within the plurality of stud holes at the opposing box surface inside;
 ii. a screw having a screw head as the ball stud head to enable the plurality of securing studs to be fixedly secured within the plurality of stud holes;
 iii. a pressure fitting clip having a clip head as the ball stud head to enable the plurality of securing studs to be fixedly secured within the plurality of stud holes; or
 iv. other of one of a plurality of securing studs fixedly secured within the plurality of stud holes;
d. the two pairs of hatch securing loops comprising one of: rope, chain, cloth bands, rubber bands, or other elastically fitting material;
e. whereby the two pairs of hatch securing loops cooperatively and securely attach to, engage on, and disengage from the first short side and the opposing second short side, at the plurality of securing studs by attaching and releasing the opposing loop free end from the ball stud head.

5. The attaching means of claim 4, wherein one of each of the two pairs of hatch securing loops further comprising: being partially, cooperatively and centrally secured at a separate loop secured end, respectively to the first short side and to the opposing second short side, and one of each of the two pairs of hatch securing loops having the opposing loop free end.

6. The low stress seedling starter box device of claim 1, the sliding drip plate comprising:
a. a first plate end and an opposing second plate end;
b. a pair of slide handles, each of the pair of slide handles attaching to the sliding drip plate, respectively at the first plate end and the opposing second plate end;
c. each of the pair of slide handles comprising: a freely engageable handle flap extending above the generally rectangular box;
d. the pair of slide handles providing easy sliding removal of the sliding drip plate; and
e. whereby the sliding drip plate is easily removed from the generally rectangular box.

7. The low stress seedling starter box device of claim 1, wherein the generally rectangular box comprising at least one of: wood, cardboard, molded plastic, or other light weight, durable material.

8. The low stress seedling starter box device of claim 1, wherein the two pairs of hatch securing loops comprising: elastic, securely fitting material.

9. The low stress seedling starter box device of claim 1, wherein the attaching means comprising at least one of:
a. a plurality of removable pins removably fixing through and securing the first short side and an opposing second short side, respectively to the first long side and an opposing second long side;
b. a plurality of joints locating on two pair of long side ends and two pair of short side ends to the respective first long side and the opposing second long side and to the first short side and the opposing second short side cooperatively and removably affixing the first short side and an opposing second short side, respectively to the first long side and an opposing second long side; or
c. other of the attaching means cooperatively and removably affixing the first short side and an opposing second short side, respectively to the first long side and an opposing second long side.

10. The low stress seedling starter box device of claim 1, wherein the pair of shelf strips comprising:
a. one of: wood, cardboard, molded plastic, or other light weight material;
b. respectively run intermittently along each of the first long side and the opposing second long side; and
c. respectively run one of: temporarily or permanently along each of the first long side and the opposing second long side.

11. A method for transplanting a plurality of seedling plants, said method comprising:
a. providing a low stress seedling starter box device, said device comprising; a generally rectangular box comprising: a first long side and an opposing second long side, a first short side and an opposing second short side, a box surface outside and an opposing box surface inside, an open box top, a box floor, a first box end and an opposing second box end, and a fixed bottom;
b. disposing a sliding drip plate over the box floor, the sliding drip plate comprising: a first plate end and an opposing second plate end, a pair of slide handles each cooperatively located on the respective first plate end and the opposing second plate end, a plurality of drain holes spaced within the sliding drip plate, and a plurality of seedling plants temporarily planted above the plurality of drain holes and on the sliding drip plate;
c. permanently adjoining the first long side and the opposing second long side to and along the fixed bottom at their respective one of a pair of junctures with the fixed bottom;
d. running a pair of shelf strips in the opposing box surface inside respectively along each of the first long side and the opposing second long side, and adjoining, abutting, and fixing the pair of shelf strips to the generally rectangular box at and proximal to the pair of junctures;
e. supporting and disposing the sliding drip plate above and proximal to the box floor by the pair of shelf strips, creating an open region within the generally rectangular box between the sliding drip plate and the box floor;
f. having seedling roots to each of the plurality of seedling plants located above the sliding drip plate;
g. providing box soil on the sliding drip plate and allowing the plurality of seedling plants to temporarily grow in the box soil;
h. allowing the first short side and the opposing second short side to attach to and to detach and be removed from the generally rectangular box;
i. securing and fitting an attaching means, respectively to the box surface outside of the first short side and the opposing second short side snugly and cooperatively against the first long side and the opposing second long side, and locating the attaching means, respectively at the first box end and the opposing second box end;
j. cooperatively attaching, and engaging and disengaging the first short side and the opposing second short side from the generally rectangular box by the attaching means, thereby allowing easy sliding removal of the sliding drip plate from the generally rectangular box;

k. placing box soil on the sliding drip plate of the generally rectangular box;
l. placing, resting, and evenly supporting the sliding drip plate on the pair of shelf strips;
m. abutting the pair of slide handles, respectively against the opposing box surface inside of the first short side and the opposing second short side;
n. allowing the plurality of seedling plants to develop in the box soil in the low stress seedling starter box device until desired timing for planting in a ground;
o. orienting the low stress seedling starter box device along and within a seedling plant row in the ground;
p. disengaging one of the attaching means, allowing the sliding drip plate to be easily accessed and removed from the generally rectangular box;
q. preparing a trough in the ground along the seedling plant row, the trough being of comparable and cooperative size to the generally rectangular box;
r. tilting one of the first long side or the opposing second long side of the generally rectangular box and in the same motion pulling the sliding drip plate out of the low stress seedling starter box device and into the seedling plant row in the trough;
s. installing the sliding drip plate containing the box soil and the plurality of seedling plants into the trough in a singular fluid motion;
t. opposingly pulling the generally rectangular box out of the trough;
u. backfilling a void space to the trough around the sliding drip plate with at least one of: the box soil or the ground; and
v. thereby transporting and transplanting the sliding drip plate of the plurality of seedling plants without disturbing the plurality of seedling plants.

12. The method for transplanting the plurality of seedling plants of claim 11, wherein the sliding drip plate is biodegradable material.

13. The sliding drip plate of claim 12, wherein the biodegradable material is composted, compressed, and formed cow manure.

14. The method for transplanting the plurality of seedling plants of claim 11, wherein the attaching means comprising:
a. running a plurality of stud holes from the box surface outside of the opposing box surface inside through the first long side and the opposing second long side proximal to the first box end and the opposing second box end, locating a plurality of securing studs permanently in the plurality of stud holes and protruding from the box surface outside of the first long side and the opposing second long side, each of the plurality of securing studs having a ball stud head proximal, respectively to the first box end and the opposing second box end;
b. providing each of two pairs of hatch securing loops with a loop secured end and the opposing loop free end;
c. partially, cooperatively and centrally securing each of the two pairs of hatch securing loops, respectively to the first short side and the opposing second short side, at the loop secured end and having the opposing loop free end attachable to the ball stud head; and
d. comprising each of the plurality of securing studs with at least one of:
  i. an externally threaded slide through peg, the ball stud head and an internally threaded ball stud, the externally threaded slide through peg securely fitting within the internally threaded ball stud to enable the plurality of securing studs to be fixedly secured within the plurality of stud holes;
  ii. a screw having a screw head as the ball stud head to enable the plurality of securing studs to be fixedly secured within the plurality of stud holes;
  iii. a pressure fitting clip having a clip head as the ball stud head to enable the plurality of securing studs to be fixedly secured within the plurality of stud holes; or
  iv. other of one of a plurality of securing studs fixedly secured within the plurality of stud holes;
e. the two pairs of hatch securing loops comprising one of: rope, chain, cloth bands, rubber bands, or other elastically fitting material; and
f. thereby cooperatively and securely attaching the two pairs of hatch securing loops to engage on, and disengage from the first short side and the opposing second short side, to the plurality of securing studs by attaching and releasing the opposing loop free end from the ball stud head.

15. The method for transplanting the plurality of seedling plants of claim 11, the sliding drip plate comprising:
a. providing each of the pair of slide handles with a freely engageable handle flap;
b. extending the freely engageable handle flap to each of the pair of slide handles extending above the generally rectangular box;
c. allowing the pair of slide handles to provide easy sliding removal of the sliding drip plate; and
d. thereby easily removing the sliding drip plate from the generally rectangular box.

16. The method for transplanting the plurality of seedling plants of claim 11, wherein the generally rectangular box comprising at least one of: wood, cardboard, molded plastic, or other light weight durable material.

17. The method for transplanting the plurality of seedling plants of claim 11, wherein the two pairs of hatch securing loops comprising: elastic, securely fitting material.

18. The method for transplanting the plurality of seedling plants of claim 11, wherein the attaching means comprising at least one of:
a. a plurality of removable pins removably fixing through and securing the first short side and an opposing second short side, respectively to the first long side and an opposing second long side;
b. a plurality of joints locating on two pair of long side ends and two pair of short side ends to the respective first long side and the opposing second long side and to the first short side and the opposing second short side, cooperatively and removably affixing the first short side and an opposing second short side, respectively to the first long side and an opposing second long side; or
c. other of the attaching means cooperatively and removably affixing the first short side and an opposing second short side, respectively to the first long side and an opposing second long side.

19. The method for transplanting the plurality of seedling plants of claim 11, wherein the pair of shelf strips comprising:
a. making one of: wood, cardboard, molded plastic, or light weight durable material;
b. running respectively, intermittently along each of the first long side and the opposing second long side; and
c. running respectively one of: temporarily or permanently along each of the first long side and the opposing second long side.

20. A method for transplanting a plurality of seedling plants, said method comprising:
- a. providing an open top and open end slide tray in which a plurality of sliding drip plates is arrayed, the open top and open end slide tray comprising: a tray floor, a first short side and an opposing second short side, and a plurality of row dividers segmenting the open top and open end slide tray into a plurality of plate spaces and separating each of the plurality of sliding drip plates;
- b. adjacently and independently arraying the plurality of sliding drip plates, respectively within the plurality of plate spaces in the open top and open end slide tray between the plurality of row dividers, each of the plurality of plate spaces comprising: a first tray long side and an opposing second tray long side, a first tray short side and an opposing second tray short side, and a pair of shelf strips, and each of said plurality of sliding drip plates comprising:
  - i. being disposed within each of the plurality of plate spaces, each of the plurality of sliding drip plates comprising: a first plate end and an opposing second plate end, a plurality of drain holes spaced within each of the plurality of sliding drip plates, and a plurality of seedling plants temporarily planted on each of the plurality of sliding drip plates within box soil;
  - ii. cooperatively attaching and locating each of a pair of slide handles to each of the plurality of sliding drip plates, at the first plate end and the opposing second plate end, each of the pair of slide handles comprising: having a freely engageable handle flap extending above the open top and open end slide tray;
  - iii. allowing the pair of slide handles to provide easy sliding removal of each of the plurality of sliding drip plates;
  - iv. permanently adjoining the first tray long side and the opposing second tray long side in each of the plurality of plate spaces to and attaching along the tray floor at their respective one of a pair of junctures;
  - v. running respectively a pair of shelf strips along each of the first tray long side and the opposing second tray long side, in each of the plurality of plate spaces, and adjoining, abutting, and fixing the pair of shelf strips to the tray floor proximal to the pair of junctures along the plurality of row dividers;
  - vi. placing, evenly supporting, and disposing the sliding drip plate on the pair of shelf strips above and proximal to the tray floor, creating an open region within each of the plurality of plate spaces between each of the plurality of sliding drip plates and the tray floor;
  - vii. placing box soil on each of the plurality of sliding drip plates above the open region;
  - viii. having seedling roots to each of the plurality of seedling plants locating in the box soil above the sliding drip plate;
  - ix. providing, containing, and supporting the box soil on each of the plurality of sliding drip plates allowing the plurality of seedling plants to temporarily grow in the box soil; and
  - x. being detachable and removable from the open top and open end slide tray;
- c. snugly securing, fitting and cooperatively attaching, and engaging, and disengaging, respectively the first short side and the opposing second short side to and against the open top and open slide tray by an attaching means, cooperatively enclosing each of the plurality of plate spaces, wherein the attaching means anchoring respectively proximally at a first tray outside end and an opposing second tray outside end;
- d. cooperatively attaching, engaging, and disengaging the attaching means from the open top and open end slide tray, thereby allowing easy sliding removal of the plurality of sliding drip plates in the plurality of plate spaces;
- e. allowing easy sliding removal of the plurality of sliding drip plates from the open top and open slide tray;
- f. allowing the plurality of seedling plants to develop on each of the plurality of sliding drip plates until planting in a ground;
- g. disengaging the attaching means to one of the first short side or the opposing second short side and removing one of the first short side or the opposing second short side to the open top and open end slide tray, allowing each of the plurality of sliding drip plates to be easily accessed and slidably removed from the respective each of the plurality of plate spaces;
- h. orienting, in turn, each of the plurality of sliding drip plates along and within a seedling plant row in the ground;
- i. preparing a trough in the ground along the seedling plant row, the trough being of comparable and cooperative size to one of the plurality of sliding drip plates;
- j. tilting the open box top and open end slide tray at the removed one of the first short side or the opposing second short side toward the trough and pulling one of the plurality of the sliding drip plates out of the open top and open end slide tray and into the seedling plant row in the trough;
- k. installing the sliding drip plate containing the box soil and the plurality of seedling plants to each of the plurality of sliding drip plates, in turn, into the trough in a singular fluid motion;
- l. opposingly pulling the open top and open end slid tray out of and away from the trough;
- m. backfilling any void space to the trough around each of the plurality of sliding drip plates planted in the ground with at least one of: the box soil or the ground; and
- n. thereby transporting and transplanting the plurality of sliding drip plates with the plurality of seedling plants without disturbing the plurality of seedling plants.

* * * * *